US009380560B2

(12) United States Patent
Yu

(10) Patent No.: US 9,380,560 B2
(45) Date of Patent: Jun. 28, 2016

(54) METHOD AND DEVICE FOR SENDING A PAGING INDICATOR CHANNEL FRAME

(75) Inventor: Qingqi Yu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 209 days.

(21) Appl. No.: 14/370,927

(22) PCT Filed: Sep. 16, 2011

(86) PCT No.: PCT/CN2011/079721
§ 371 (c)(1),
(2), (4) Date: Jul. 7, 2014

(87) PCT Pub. No.: WO2012/155421
PCT Pub. Date: Nov. 22, 2012

(65) Prior Publication Data
US 2014/0376472 A1 Dec. 25, 2014

(30) Foreign Application Priority Data

Aug. 4, 2011 (CN) .......................... 2011 1 0222526

(51) Int. Cl.
*H04W 68/02* (2009.01)
*H04W 52/32* (2009.01)
(Continued)

(52) U.S. Cl.
CPC ............ *H04W 68/02* (2013.01); *H04W 52/143* (2013.01); *H04W 52/322* (2013.01); *H04W 52/36* (2013.01); *H04W 52/367* (2013.01); *H04W 68/025* (2013.01); *Y02B 60/50* (2013.01)

(58) Field of Classification Search
CPC . H04W 52/143; H04W 52/322; H04W 52/36; H04W 52/04; H04W 52/16; H04W 52/18; H04W 52/30; H04W 52/367; H04W 52/325; H04W 68/02; H04W 68/025; Y02B 60/50

USPC ......... 370/247, 252, 278, 311, 318, 328–329, 370/341, 431, 450, 459, 491, 524; 455/68, 455/434, 443, 450, 453, 464, 509, 522, 455/115.3
See application file for complete search history.

(56) References Cited

U.S. PATENT DOCUMENTS 6,138,034 A * 10/2000 Willey ................ H04W 68/025
340/7.32
7,206,331 B2 * 4/2007 Zhu ........................ H04W 68/02
375/130

(Continued)

FOREIGN PATENT DOCUMENTS

CN 1398074 A 2/2003
CN 1486010 A 3/2004
(Continued)

OTHER PUBLICATIONS

International Search Report for PCT/CN2011/079721 dated Apr. 25, 2012.
(Continued)

*Primary Examiner* — Mohamed Kamara
(74) *Attorney, Agent, or Firm* — Ling Wu; Stephen Yang; Ling and Yang Intellectual Property

(57) ABSTRACT

A method and apparatus for transmitting a paging indicator channel frame are provided in the present invention, wherein, the method includes: a base station, according to values of various Paging indicators (PIs) in the paging indicator channel frame, deciding to transmit the paging indicator channel frame or a BitsGroup corresponding to the paging indicator in the paging indicator channel frame at a first power or a second power, wherein, the second power is less than the first power. The apparatus includes a paging indicator value analyzing unit and a paging indicator channel frame transmitting unit. The invention reduces the power overhead of the base station, reduces the power consumption of the base station, and enhances the pilot channel quality of the cell primary common pilot channel.

6 Claims, 5 Drawing Sheets

(51) Int. Cl.
  *H04W 52/14* (2009.01)
  *H04W 52/36* (2009.01)

(56) References Cited

U.S. PATENT DOCUMENTS

| | | |
|---|---|---|
| 2002/0132586 A1* | 9/2002 | Chen .................... H04W 68/02 455/69 |
| 2003/0063579 A1 | 4/2003 | Lee |
| 2009/0082041 A1* | 3/2009 | Ranganathan ........ H04W 28/02 455/458 |
| 2010/0069091 A1* | 3/2010 | El-Saidny ............. H04L 12/189 455/456.3 |

FOREIGN PATENT DOCUMENTS

| | | |
|---|---|---|
| CN | 101277133 A | 10/2008 |
| WO | 0022869 A1 | 4/2000 |

OTHER PUBLICATIONS

3GPP TSG RAN WG1#15 Siemens AG, Mitsubishi Electric, CR026r2 for TS25.221. Aug. 22-25, 2000, XP050093222.

* cited by examiner

METHOD AND DEVICE FOR SENDING A PAGING INDICATOR CHANNEL FRAME

TECHNICAL FIELD

The patent document relates to the field of mobile communications, and in particular, to a method and apparatus for transmitting a Paging Indicator Channel (PICH) frame.

BACKGROUND OF THE RELATED ART

The principle for paging a User Equipment (UE) of the 3rd Generation Partnership Project (3GPP) protocol is that:

paging information of the UE is transmitted through a Paging Channel (PCH).

A Paging Indicator Channel (PICH) is defined, which carries Paging Indicator (PI) information of the UE. Thus, without demodulating the paging channel in real time, the UE can know whether it is paged currently by only monitoring information of a particular PI location of the PICH according to a specified period, and then decides whether to demodulate the PCH, thus achieving the purpose of saving power of the UE.

There are 288 bits per frame in the PICH for carrying Paging Indicators (PIs), and the number i.e., Np, of PIs which can be carried at the same time may be taken as 18, 36, 72 or 144. Np is obtained from a PICH mode information element of a COMMON TRANSPORT CHANNEL SETUP REQUEST message sent by a Radio Network Controller (RNC) to a base station (or a NodeB).

FIG. 1 is a diagram of a structure of a PCH frame sent by a RNC to a base station. Wherein, a PI-bitmap field includes Np bits, each bit corresponds to one PI, each PI corresponds to one user, and a bit string for indicting the value of the PI within a payload field in the PICH frame corresponding to each PI is referred to as a BitsGroup, and the number of bits occupied by the BitsGroup is 288/Np.

For example, when Np=144, a BitsGroup corresponding to each PI occupies 2 bits; and for example, when Np=18, a BitsGroup corresponding to each PI occupies 16 bits.

The BitsGroup is used to carry the PIs. Take Np=18 as an example. Each BitsGroup includes 16 bits. If PI is 1, all bits in the BitsGroup corresponding to the PI are 1; and if PI is 0, all bits in the BitsGroup corresponding to the PI are 0.

According to the requirements of the 3GPP protocol, if there is a user paged at a location corresponding to a PI, the PI is set to 1, and all bits in the BitsGroup corresponding to the PI are 1; and there is no user paged at a location corresponding to a PI, the PI is set to 0, and all bits in the BitsGroup corresponding to the PI are 0.

Take Np=18 and PI bitmap='010010000000000000' as an example. The contents transmitted by the PICH frame are shown in FIG. 2.

The 3GPP has the following problems with the current processing of the PICH:

According to the definition of the 3GPP, in the PICH frame, when there is no UE needed to be paged, the PI of a corresponding location of the UE is 0, the BitsGroup corresponding to the PI transmits all 0, and the transmission power of the BitsGroup is the same as that of a BitsGroup which transmits all 1 when there is paging.

Generally, in order to ensure a higher paging success rate, it needs to configure a higher PICH power. However, in fact, when there is no paging, a smaller power may be used, which allows PICH false detection with a certain probability.

Table one gives a common channel power configuration of commercial typical cell when Np=18.

TABLE ONE

| Channel type | Number | Power  | Duty cycle | Conversion to W |
|---|---|---|---|---|
| PCPICH  | 1 | 33 dbm | 1    | 2.000 |
| PCCPCH  | 1 | −3 db  | 0.9  | 0.900 |
| PICH    | 1 | −7 db  | 0.96 | 0.382 |
| PSCH    | 1 | −5 db  | 0.1  | 0.063 |
| SSCH    | 1 | −5 db  | 0.1  | 0.063 |
|         |   |        | Total power (W): | 3.408 |

(Note: according to the requirements of the 3GPP protocol, for the downlink common channels, except that the PCPCH uses an absolute power in units of dbm, powers of other channels are relative to the power of the PCPICH in units of db, similarly hereinafter)

According to the above typical common channel configuration, the power of the PICH occupies 11.3% of the no-load total power. In fact, if Np is greater than 18, the power of the PICH occupies a larger proportion of the total power.

In a commercial network, in most cases, the corresponding PIs in the PICH are 0, that is, there is no user paged. At this time, if the PICH frame continues to be transmitted at the PICH power configured according to the 3GPP protocol, it will result in a waste of power. The waste of the PICH power also increases downlink interference of the cell, deteriorates the pilot channel quality of the cell primary common pilot channel (for example, Echo), and influences the downlink coverage and the normal quality of service.

SUMMARY OF THE INVENTION

The purpose of the patent document is to provide a method and apparatus for transmitting a PICH frame, to solve the problem how to reduce power overhead of the base station and enhance the pilot channel quality of the cell primary common pilot channel.

In order to solve the above technical problem, the patent document provides a method for transmitting a PICH frame, comprising:

a base station, according to values of various PIs in the PICH frame, deciding to transmit the PICH frame or a BitsGroup corresponding to the paging indicator in the PICH frame at a first power or a second power, wherein, the second power is less than the first power.

In the method according to the patent document, when all values of various PIs in the PICH frame of the base station are 1, the PICH frame is transmitted at the first power; and when all values of various PIs in the PICH frame of the base station are 0, the PICH frame is transmitted at the second power.

In the method according to the patent document, when a part of values of various PIs in the PICH frame of the base station are 1, the PICH frame is transmitted at the first power.

In the method according to the patent document, when a part of values of various PIs in the PICH frame of the base station are 1, a BitsGroup corresponding to a PI of which the value is 1 in the PICH frame is transmitted at the first power, and a BitsGroup corresponding to a PI of which the value is 0 in the PICH frame is transmitted at the second power.

In the method according to the patent document, the BitsGroup corresponding to the PI refers to a bit string for indicting the value of the PI within a payload field in the PICH frame.

In the method according to the patent document, the first power is a power for transmitting the PICH frame configured by a radio network controller to the base station.

The method further comprises:

the base station acquiring a power offset for representing a difference between the first power and the second power or calculating and obtaining the second power according to a fault power offset.

In order to solve the above technical problem, the patent document provides an apparatus for transmitting a PICH frame, comprising a paging indicator value analyzing unit and a PICH frame transmitting unit, wherein, the paging indicator value analyzing unit is configured to analyze values of various PIs in a PICH frame and output the values to the PICH frame transmitting unit; and the PICH frame transmitting unit is configured to decide to transmit the PICH frame or a BitsGroup corresponding to the PI in the PICH frame at a first power or a second power according to the values of various PIs in the PICH frame output by the paging indicator value analyzing unit, wherein, the second power is less than the first power.

In the apparatus according to the patent document, the PICH frame transmitting unit is configured to decide to transmit the PICH frame or a BitsGroup corresponding to the PI in the PICH frame at a first power or a second power by the following mode: when all values of various PIs in the PICH frame are 1, transmitting the PICH frame at the first power; and when all values of various PIs in the PICH frame are 0, transmitting the PICH frame at the second power.

In the apparatus according to the patent document, the PICH frame transmitting unit is configured to decide to transmit the PICH frame or a BitsGroup corresponding to the PI in the PICH frame at a first power or a second power by the following mode: when a part of values of various PIs in the PICH frame are 1, transmitting the PICH frame at the first power.

In the apparatus according to the patent document, the PICH frame transmitting unit is configured to decide to transmit the PICH frame or a BitsGroup corresponding to the PI in the PICH frame at a first power or a second power by the following mode: when a part of values of various PIs in the PICH frame are 1, transmitting a BitsGroup corresponding to a PI of which the value is 1 in the PICH frame at the first power, and transmitting a BitsGroup corresponding to a PI of which the value is 0 in the PICH frame at the second power.

The apparatus further comprises:

an acquisition module, configured to acquire a power offset for representing a difference between the first power and the second power or calculate the second power according to a fault power offset and output it to the PICH frame transmitting unit.

In the related art, the base station transmits the PICH frame at the same transmission power for conditions that there is paging and that there is no paging, thus increasing the overhead of the transmission power of the base station. In the present scheme, different PICH transmission powers are used according to different cases that there is paging and that there is no paging. Compared with the related art, the present scheme reduces power overhead of the base station, reduces power consumption of the base station, and enhances pilot channel quality of the cell primary common pilot channel, thus solving the problem in the related art that the power overhead of the base station is too large when the PICH frame is transmitted.

PREFERRED EMBODIMENTS OF THE PRESENT INVENTION

In order to make purposes, technical schemes and advantages of the patent document more clear and apparent, the embodiments of the present invention will be described in detail hereinafter in conjunction with accompanying drawings. It should be illustrated that, in the case of no conflict, the embodiments of this application and the features in the embodiments could be combined randomly with each other.

Figure 1:
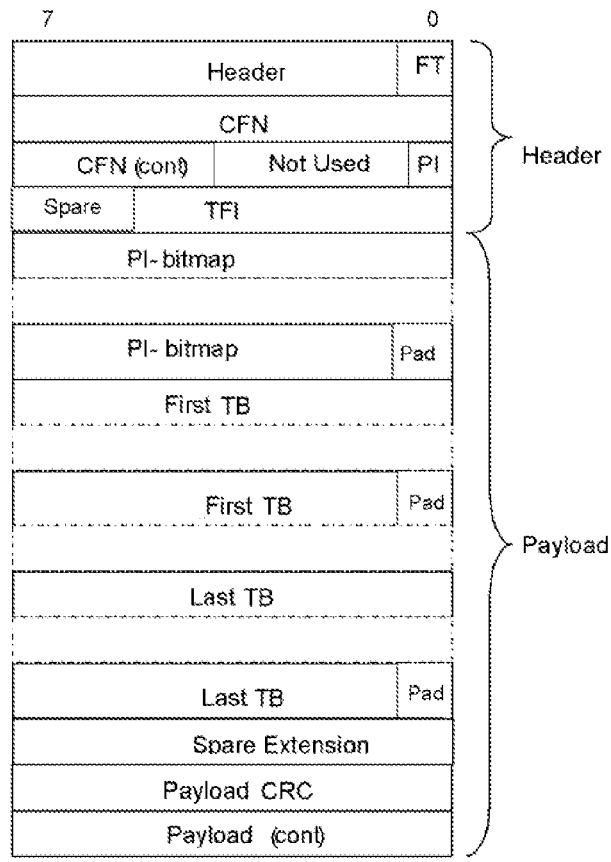
FIG. 1 is a diagram of a structure of a PCH frame.
Figure 2:
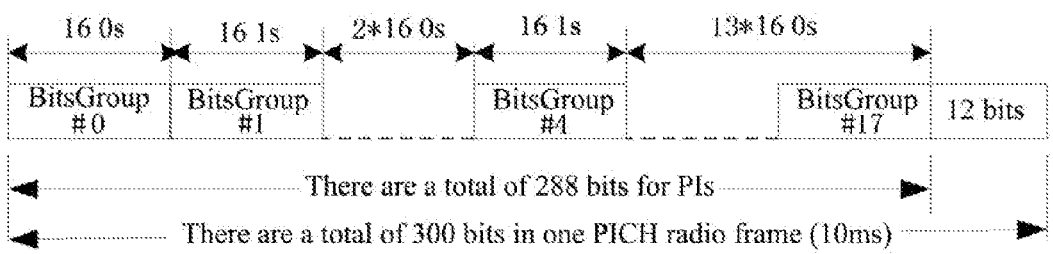
FIG. 2 is a diagram of contents transmitted by a PICH frame by taking Np=18 and PI bitmap='010010000000000000' as an example.
Figure 3:
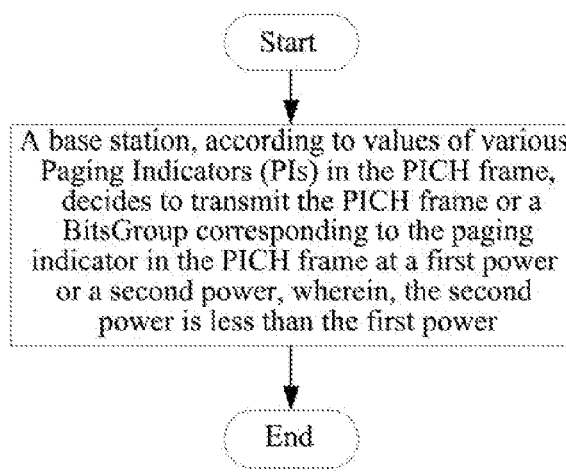
FIG. 3 is a diagram of a method for transmitting a PICH frame in the present scheme.

As shown in FIG. 3, a method for transmitting a Paging Indicator Channel (PICH) frame according to the present embodiment comprises:

a base station, according to values of various Paging Indicators (PIs) in the PICH frame, deciding to transmit the PICH frame or a BitsGroup corresponding to the PI in the PICH frame at a first power or a second power, wherein, the second power is less than the first power.

In the present embodiment, when all values of various PIs in the PICH frame of the base station are 1, the PICH frame is transmitted at the first power; and when all values of various PIs in the PICH frame of the base station are 0, the PICH frame is transmitted at the second power.

When a part of values of various PIs in the PICH frame of the base station are 1, the PICH frame is transmitted at the first power.

When a part of values of various PIs of the base station in the PICH frame are 1, a BitsGroup corresponding to a PI of which the value is 1 in the PICH frame is transmitted at the first power, and a BitsGroup corresponding to a PI of which the value is 0 in the PICH frame is transmitted at the second power.

The BitsGroup corresponding to the PI refers to a bit string for indicting the value of the PI within a payload field in the PICH frame.

The first power is a power for transmitting the PICH frame configured by a radio network controller to the base station.

A power offset is defined as a difference between a first power and a second power. The base station acquires a power offset for representing a difference between the first power and the second power or calculates the second power according to a fault power offset.

Wherein, the value range of the first power is −10 db~5 db, and the value range of the power offset (Poff) is 1~10 db.

An apparatus for transmitting a Paging Indicator Channel (PICH) frame according to the present embodiment is located in a base station or is the base station itself, and the apparatus comprises a paging indicator value analyzing unit and a PICH frame transmitting unit, wherein, the paging indicator value analyzing unit is configured to analyze values of various Paging Indicators (PIs) in a PICH frame and output the values to the PICH frame transmitting unit; and the PICH frame transmitting unit is configured to decide to transmit the PICH frame or a BitsGroup corresponding to the PI in the PICH frame at a first power or a second power according to the values of various PIs in the PICH frame output by the paging indicator value analyzing unit, wherein, the second power is less than the first power.

The specific execution mode of the PICH frame transmitting unit is the same as that described in the above method embodiment, and the description thereof will be omitted here.

The apparatus further comprises:

an acquisition module, configured to acquire a power offset for representing a difference between the first power and the second power or calculate the second power according to a fault power offset and output it to the PICH frame transmitting unit.

For ease of illustration, for the condition of PIs carried in the PICH frame corresponding to the above method, the following three types of PICH frames are defined:

a first type: a "PICH frame in which all PIs are 0":

All of Np PIs carried in this type of PICH frame are 0, there is no user paged, and first 288 bits of the PICH frame are all set to 0;

a second type: a "PICH frame in which all PIs are 1":

all of Np PIs carried in this type of PICH frame are 1, a user of each location corresponding to the frame is paged, and first 288 bits of the PICH frame are all set to 1;

a third type: a "PICH frame in which a part of PIs are 1":

in this type of PICH frame, Np PIs are carried, at least one PI is 1 and at least one PI is 0, and a BitsGroup corresponding to a location where PIs are 1 transmits all 1, and a BitsGroup corresponding to a location where PIs are 0 transmits all 0;

A first power is defined as PichPower1, and a second power is defined as PichPower0.

There are two processing schemes for the above method according to the frequency of the power adjustment of the PICH frame:

Scheme one: "the PICH frame adjusting the transmission power in units of frames", which is as follows.

If the NodeB judges that the PICH frame is a "PICH frame in which all PIs are 1", then the NodeB transmits the PICH frame at a transmission power of PichPower1;

if the NodeB judges that the PICH frame is a "PICH frame in which all PIs are 0", then the NodeB transmits the PICH frame at a transmission power of PichPower0; and if the NodeB judges that the PICH frame is a "PICH frame in which a part of PIs are 1", then the NodeB transmits the PICH frame at a transmission power of PichPower1.

Scheme two: "the PICH frame adjusting the transmission power in units of PIs", which is as follows.

If the NodeB judges that the PICH frame is a "PICH frame in which all PIs are 1", then the NodeB transmits the PICH frame at a transmission power of PichPower1;

if the NodeB judges that the PICH frame is a "PICH frame in which all PIs are 0", then the NodeB transmits the PICH frame at a transmission power of PichPower0; and if the NodeB judges that the PICH frame is a "PICH frame in which a part of PIs are 1", then for the BitsGroup corresponding to the location where PIs are 1, the transmission power is PichPower1; and for the BitsGroup corresponding to the location where PIs are 0, the transmission power is PichPower0.

Figure 4:
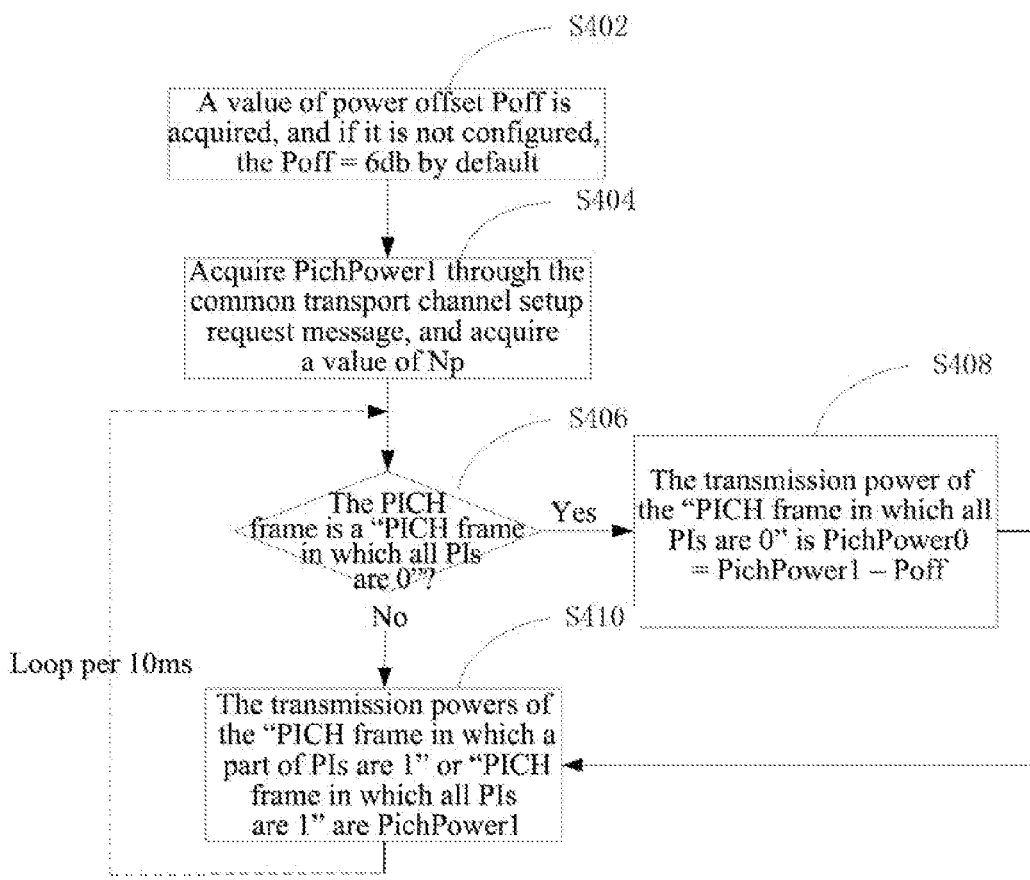
FIG. 4 is a preferred flowchart of a method for transmitting a PICH frame by using scheme one of "the PICH frame adjusting the transmission power in units of frames"

The method for transmitting a PICH frame by using scheme one of "the PICH frame adjusting the transmission power in units of frames" will be described in detail below in conjunction with FIG. 4, which specifically comprises the following steps.

In step S402, a power offset value Poff is acquired, and the meaning of Poff is that the power for the PICH transmitting 0 is less than the power for transmitting 1 by Poff.

Specifically, after the base station is powered on, the base station acquires a Poff value from the NBAP signaling which is operated and maintained or extended. The definition of Poff is: Poff=PichPower1−PichPower0, wherein, PichPower1 is a transmission power of the PICH acquired by the NodeB through the common transport channel setup message of cell; and PichPower0 is a power when the PICH frame transmits bits 0 which is specified in the patent document, and if the Poff is not configured, the Poff is set to 6 db;

In step S404, the NodeB acquires a PICH power through the common transport channel setup message of cell, which is defined as PichPower1, and acquires the value of Np at the same time.

Specifically, the value of PichPower1 can be obtained from a "PICH power" information element in a "common transport channel setup request" message of the NBAP, and the value of NP can be obtained from a "PICH mode" information element.

In step S406, it is checked whether the current PICH frame is a "PICH frame in which all PIs are 0", and if so, turn to step S408; and if not, turn to step S410;

in step S408, for the "PICH frame in which all PIs are 0", the transmission power is set to PichPower0=PichPower1−Poff.

in step S410, for a frame which is not the "PICH frame in which all PIs are 0", the transmission power is set to PichPower1;

Preferably, the execution processes of steps S406-S410 are repeated one time per frame (10 ms).

Figure 5:
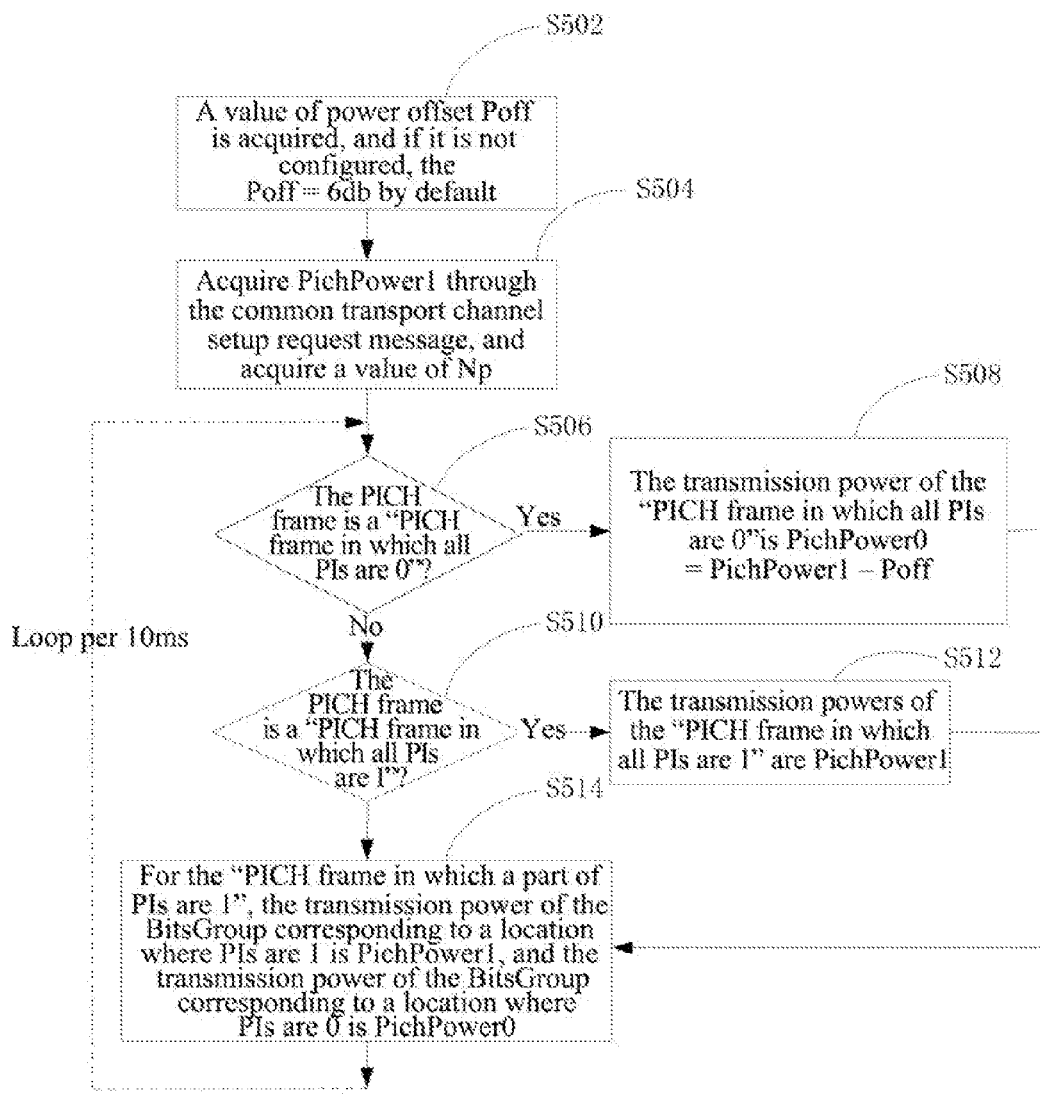
FIG. 5 is a preferred flowchart of a method for transmitting a PICH frame by using scheme two of "the PICH frame adjusting the transmission power in units of PIs"

The method for transmitting a PICH frame by using scheme two of "the PICH frame adjusting the transmission power in units of PIs" will be described in detail below in conjunction with FIG. 5, which specifically comprises the following steps.

In step S502, a power offset value Poff is acquired, and the meaning of Poff is that the power for the PICH transmitting 0 is less than the power for transmitting 1 by Poff.

Specifically, after the base station is powered on, the base station acquires a Poff value from the NBAP signaling which is operated and maintained or extended. The definition of Poff is: Poff=PichPower1−PichPower0, wherein, PichPower1 is a transmission power of the PICH acquired by the NodeB through the common transport channel setup message of cell; and PichPower0 is a power when the PICH frame transmits bits 0 which is specified in the patent document, and if the Poff is not configured, the Poff is set to 6 db;

in step S504, the NodeB acquires a PICH power through the common transport channel setup message of cell, which is defined as PichPower1, and acquires the value of Np at the same time.

Specifically, the value of PichPower1 can be obtained from a "PICH power" information element in a "common transport channel setup request" message of the NBAP, and the value of NP can be obtained from a "PICH mode" information element.

In steps S506-S514, in the PICH frame, for the BitsGroup carrying PIs equal to 1, the transmission power thereof is set to PichPower1, and for the BitsGroup carrying PIs equal to 0, the transmission power thereof is set to PichPower0=PichPower1−Poff.

Specifically, in step S506, it is checked whether the current PICH frame is a "PICH frame in which all PIs are 0", and if so, turn to step S508; and if not, turn to step S510;

in step S508, for the "PICH frame in which all PIs are 0", the transmission power is set to PichPower0=PichPower1−Poff.

in step S510, it is checked whether the current PICH frame is a "PICH frame in which all PIs are 1", and if so, turn to step S512; and if not, turn to step S514;

in step S512, for the "PICH frame in which all PIs are 1", the transmission power is set to PichPower1;

in step S514, for "PICH frame in which a part of PIs are 1":
for the BitsGroup corresponding to a location where PIs are 1, the transmission power is PichPower1. and
for the BitsGroup corresponding to a location where PIs are 0, the transmission power is PichPower0.

Preferably, the execution processes of steps S506-S514 are repeated one time per frame (10 ms).

The patent document will be described in detail below with reference to accompanying drawings in combination with specific embodiments.

Specific Embodiment One

Figure 6:
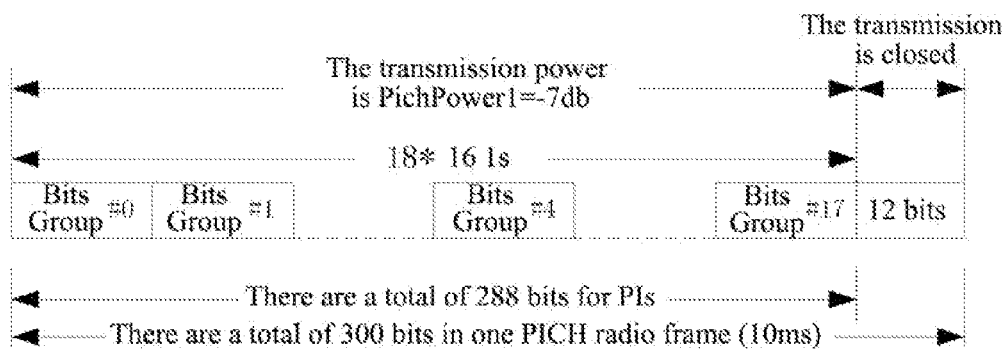
FIG. 6 is a diagram of a mode for transmitting a PICH frame in a specific embodiment one.

FIG. 6 is a diagram of a transmission power of a PICH frame which is required in the present scheme for a "PICH frame in which all PIs are 1" when Np=18 and PichPower1=−7 db which is configured by a RNC.

At this time, PI bitmap='111111111111111111', i.e., all of 18 PIs corresponding to the PICH frame are 1.

One BitsGroup is defined to correspond to all bits of one PI. Take Np=18 as an example. Each BitsGroup includes 16 bits.

For a "PICH frame in which all PIs are 1", the transmission power is set to PichPower1=−7 db in the present specific embodiment.

Specific Embodiment Two

Figure 7:
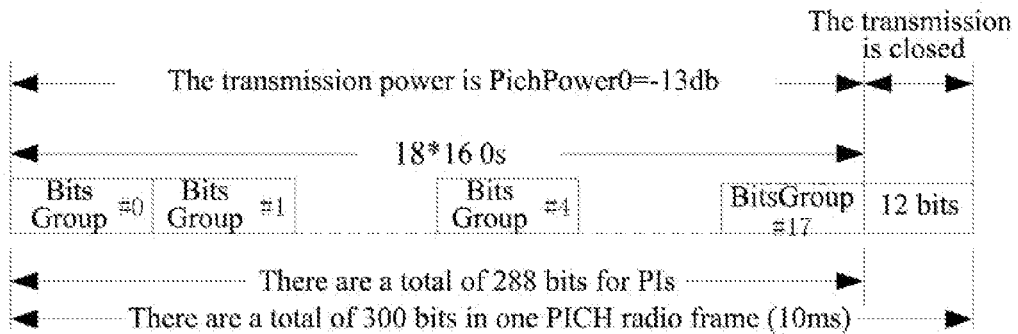
FIG. 7 is a diagram of a mode for transmitting a PICH frame in a specific embodiment two.

FIG. 7 is a diagram of a transmission power of a PICH frame which is required in the present scheme for a "PICH frame in which all PIs are 0" when Np=18, PichPower1=−7 db which is configured by a RNC and Poff=6 db.

At this time, PI bitmap='000000000000000000', i.e., all of 18 PIs corresponding to the PICH frame are 0.

In the present specific embodiment, according to the specification of the present scheme, for the "PICH frame in which all PIs are 0", the transmission power is
PichPower0=PichPower1−Poff=−13 db.

Specific Embodiment Three

Figure 8:
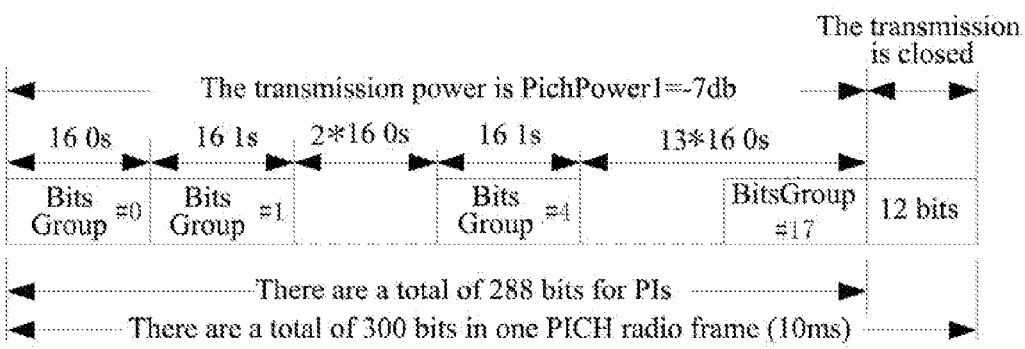
FIG. 8 is a diagram of a mode for transmitting a PICH frame in a specific embodiment three.

FIG. 8 is a diagram of a transmission power when using scheme one of "the PICH frame adjusting the transmission power in units of frames" for a "PICH frame in which a part of PIs are 1" assuming that Np=18, PichPower1=−7 db which is configured by a RNC, Poff=6 db and PI bitmap='010010000000000000'.

For the "PICH frame in which a part of PIs are 1", the transmission powers used by all BitsGroups are PichPower1.

Therefore, in the present specific embodiment, the transmission powers of first 288 bits of the PICH frame are PichPower1=−7 db.

Specific Embodiment Four

Figure 9:
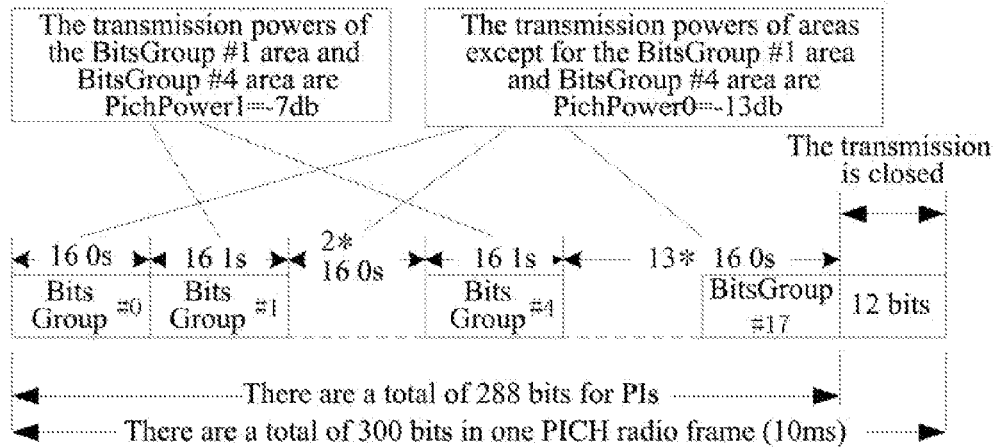
FIG. 9 is a diagram of a mode for transmitting a PICH frame in a specific embodiment four.

FIG. 9 is a diagram of a transmission power when using scheme two of "the PICH frame adjusting the transmission power in units of PIs" for a "PICH frame in which a part of PIs are 1" assuming that Np=18, PichPower1=−7 db which is configured by a RNC, Poff=6 db and PI bitmap='010010000000000000'.

For the "PICH frame in which a part of PIs are 1":
for the BitsGroup corresponding to a location where PIs are 1, the transmission power is PichPower1.
for the BitsGroup corresponding to a location where PIs are 0, the transmission power is PichPower0.

In the present specific embodiment, according to the contents of PI bitmap, in the 18 BitsGroups, only BitsGroup1 and BitsGroup4 transmit all 1, and remaining BitsGroups transmit all 0;

therefore,
for the BitsGroup1 and BitsGroup4, the transmission power is PichPower1=−7 db; and
for the remaining BitsGroups, the transmission power is PichPower0=PichPower1−Poff=−13 db.

Specific Embodiment Five

Figure 10:
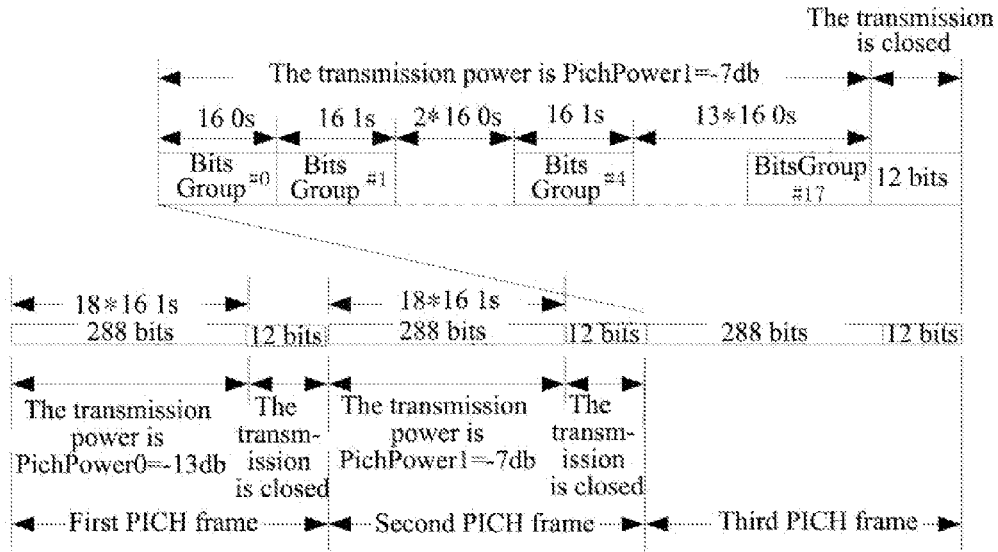
FIG. 10 is a diagram of a mode for transmitting a PICH frame in a specific embodiment five.

FIG. 10 is an embodiment when using scheme one of "the PICH frame adjusting the transmission power in units of frames" assuming that Np=18, PichPower1=−7 db which is configured by a RNC, Poff=6 db and for three continuous PICH frames, a first frame is a "PICH frame in which all PIs are 0", a second frame is a "PICH frame in which all PIs are 1", and a third frame is a "PICH frame in which a part of PIs are 1" (assuming that PI bitmap='010010000000000000').

Figure 11:
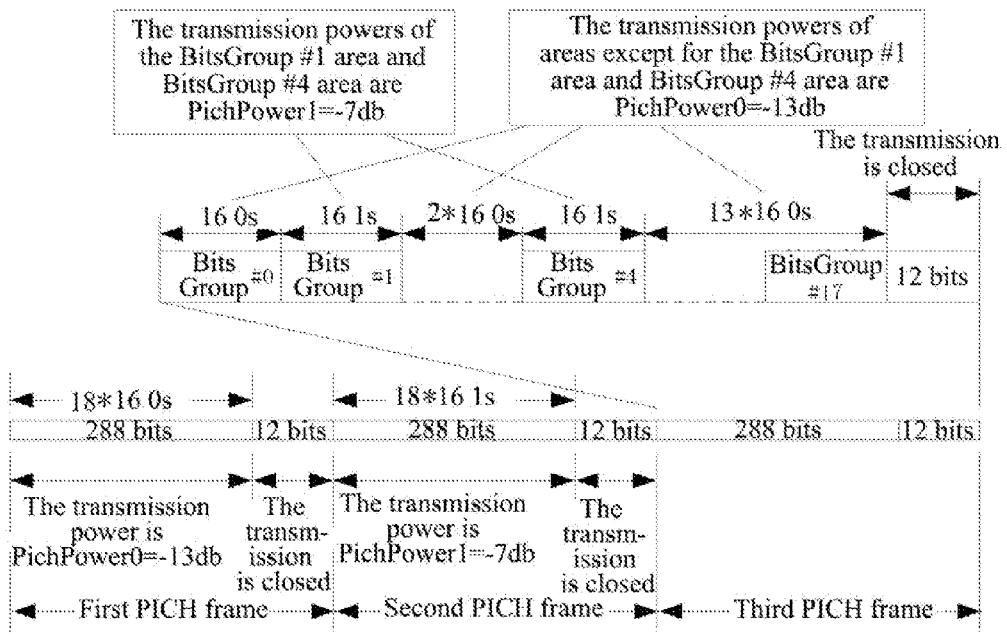
FIG. 11 is a diagram of a mode for transmitting a PICH frame in a specific embodiment six.

A power offset value Poff is acquired, and in the present embodiment, Poff=6 db;

a value of PichPower1 is obtained from a "PICH power" information element in a "common transport channel setup request" message of the NBAP, and a value of Np is obtained from a "PICH mode" information element, and in the present embodiment, PichPower1=−7 db and Np=18; and the number of bits corresponding to one BitsGroup of one PI is 288/Np=16 bits;

the NodeB determines transmission power of the PICH frame per frame (10 ms) according to the contents of the PI carried in the PICH frame as follows:

for the first PICH frame, the NodeB judges that it is the "PICH frame in which all PIs are 0", and the transmission power of the PICH frame is set as:
PichPower0=PichPower1−Poff=−13 db for the second PICH frame, the NodeB judges that it is the "PICH frame in which all PIs are 1", and the transmission power of the PICH frame is set as:
PichPower1=−7 db for the third PICH frame, the NodeB judges that it is the "PICH frame in which a part of PIs are 1", and the transmission power of the PICH frame is set as:
PichPower1=−7 db, Specific Embodiment Six FIG. 11 is an embodiment when using scheme two of "the PICH frame adjusting the transmission power in units of PIs"

assuming that Np=18, PichPower1=−7 db which is configured by a RNC, Poff=6 db and for three continuous PICH frames, a first frame is a "PICH frame in which all PIs are 0", a second frame is a "PICH frame in which all PIs are 1", and a third frame is a "PICH frame in which a part of PIs are 1" (assuming that PI bitmap='010010000000000000').

A value of power offset Poff is acquired, and in the present embodiment, Poff=6 db; a value of PichPower1 is obtained from a "PICH power" information element in a "common transport channel setup request" message of the NBAP, and a value of Np is obtained from a "PICH mode" information element, and in the present embodiment, PichPower1=−7 db and Np=18; and the number of bits corresponding to one BitsGroup of one PI is 288/Np=16 bits;

the NodeB determines transmission power of each BitsGroup of the PICH frame per frame (10 ms) according to the contents of the PI carried in the PICH frame as follows:

for the first PICH frame, the NodeB judges that it is the "PICH frame in which all PIs are 0", and the transmission power of the PICH frame is set as:

PichPower0=PichPower1−Poff=−13 db for the second PICH frame, the NodeB judges that it is the "PICH frame in which all PIs are 1", and the transmission power of the PICH frame is set as:

PichPower1=−7 db for the third PICH frame, the NodeB judges that it is the "PICH frame in which a part of PIs are 1", and according to the contents of PI bitmap, in the 18 BitsGroups, only BitsGroup1 and BitsGroup4 transmit all 1, and remaining BitsGroups transmit all 0;

therefore, for the BitsGroup1 and BitsGroup4, the transmission power is set as: PichPower1=7 db; and for the remaining BitsGroups, the transmission power is set as: PichPower0=PichPower1−Poff=−13 db.

Of course, the patent document can have a plurality of other embodiments. Without departing from the spirit and substance of the patent document, those skilled in the art can make various corresponding changes and variations according to the patent document, and all these corresponding changes and variations should belong to the protection scope of the appended claims in the patent document.

A person having ordinary skill in the art can understand that all or a part of steps in the above method can be implemented by programs instructing related hardware, which can be stored in a computer readable storage medium, such as a read-only memory, a disk or a CD etc. Alternatively, all or a part of steps in the above embodiments can also be implemented by one or more integrated circuits. Accordingly, each module/unit in the above embodiments can be implemented in the form of hardware, or can also be implemented in the form of software functional module. The patent document is not limited to any particular form of a combination of hardware and software.

INDUSTRIAL APPLICABILITY

The patent document reduces power overhead of the base station, reduces power consumption of the base station, and enhances pilot channel quality of the cell primary common pilot channel, thus solving the problem in the related art that the power overhead of the base station is too large when the PICH frame is transmitted.

What is claimed is:

1. A method for transmitting a Paging Indicator Channel (PICH) frame, comprising:

a base station, according to values of various Paging Indicators (PIs) in the PICH frame, deciding to transmit the PICH frame or a BitsGroup corresponding to the PIs in the PICH frame at a first power or a second power, wherein, the second power is less than the first power; and wherein:

when all values of PIs in the PICH frame of the base station are 1, the PICH frame is transmitted at the first power;

when all values of PIs in the PICH frame of the base station are 0, the PICH frame is transmitted at the second power;

when a part of values of various PIs in the PICH frame of the base station are 1, a BitsGroup corresponding to PIs of which the values are 1 in the PICH frame is transmitted at the first power, and a BitsGroup corresponding to PIs of which the values are 0 in the PICH frame is transmitted at the second power.

2. The method according to claim 1, wherein, the BitsGroup corresponding to the PIs refers to a bit string for indicting the values of the PIs within a payload field in the PICH frame.

3. The method according to claim 1, wherein, the first power is a power for transmitting the PICH frame configured by a radio network controller to the base station.

4. The method according to claim 3, further comprising:

the base station acquiring a power offset for representing a difference between the first power and the second power or calculating and obtaining the second power according to a fault power offset.

5. An apparatus for transmitting a Paging Indicator Channel (PICH) frame, comprising a processor and a storage device, wherein the storage device stores processor-executable programs, and the programs comprise a paging indicator value analyzing unit and a PICH frame transmitting unit, wherein, the paging indicator value analyzing unit is configured to analyze values of various Paging Indicators (PIs) in a PICH frame and output the values to the PICH frame transmitting unit; and the PICH frame transmitting unit is configured to decide to transmit the PICH frame or a BitsGroup corresponding to the PIs in the PICH frame at a first power or a second power according to the values of various PIs in the PICH frame output by the paging indicator value analyzing unit, wherein, the second power is less than the first power;

wherein, the PICH frame transmitting unit is configured to decide to transmit the PICH frame or a BitsGroup corresponding to the PI in the PICH frame at a first power or a second power by a following mode:

when all values of PIs in the PICH frame are 1, transmitting the PICH frame at the first power;

when all values of PIs in the PICH frame are 0, transmitting the PICH frame at the second power;

when a part of values of various PIs in the PICH frame are 1, transmitting a BitsGroup corresponding to PIs of which the values are 1 in the PICH frame at the first power, and transmitting a BitsGroup corresponding to PIs of which the values are 0 in the PICH frame at the second power.

6. The apparatus according to claim 5, the programs further comprising:
  an acquisition module, configured to acquire a power offset for representing a difference between the first power and the second power or calculate and obtain the second power according to a fault power offset, and output the power offset or the second power to the PICH frame transmitting unit.

\* \* \* \* \*